May 24, 1932. A. LAUKHUFF 1,859,371
GAUGE FOR USE WITH CUTTERS
Filed Jan. 5, 1928 2 Sheets-Sheet 1

INVENTOR.
Alfred Laukhuff
BY
ATTORNEY.

May 24, 1932.  A. LAUKHUFF  1,859,371
GAUGE FOR USE WITH CUTTERS
Filed Jan. 5, 1928   2 Sheets-Sheet 2
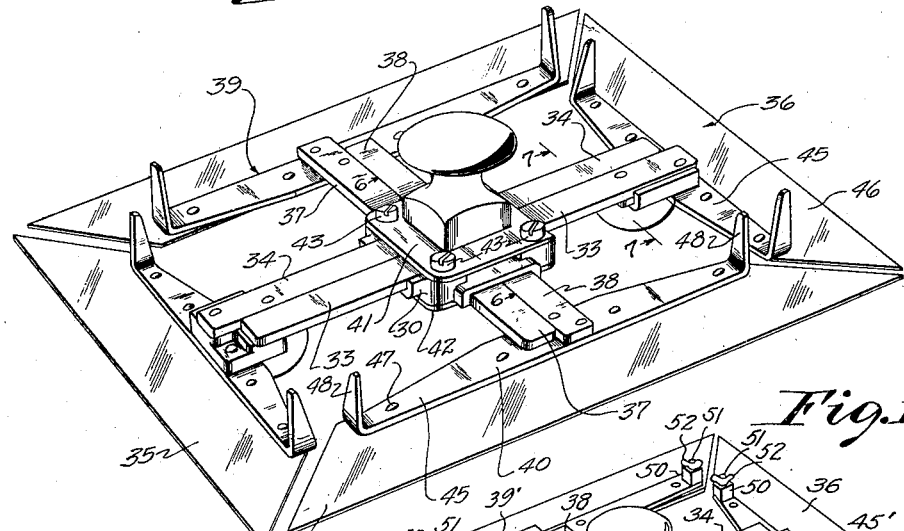
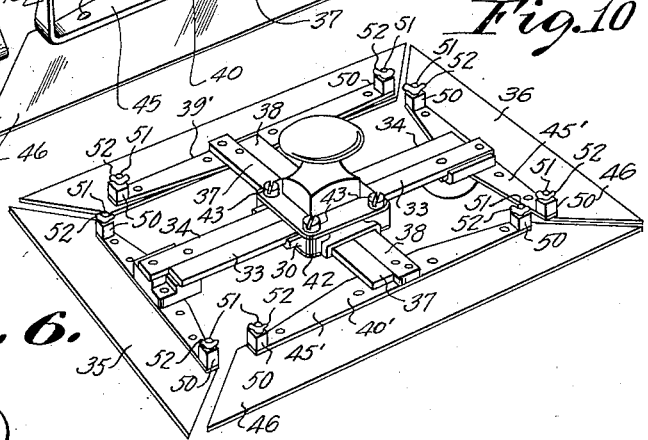
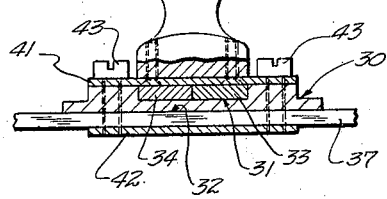
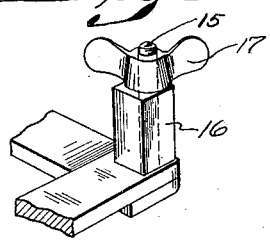
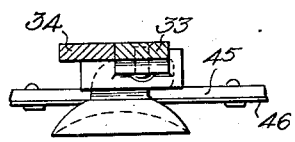
INVENTOR.
Alfred Laukhuff
BY
ATTORNEY.

Patented May 24, 1932

1,859,371

UNITED STATES PATENT OFFICE

ALFRED LAUKHUFF, OF MILWAUKEE, WISCONSIN

GAUGE FOR USE WITH CUTTERS

Application filed January 5, 1928. Serial No. 244,583.

This invention relates in general to apparatus for cutting various objects and materials and although especially designed and adapted for use in cutting or trimming photographs, may also be employed with advantage in many other diverse applications.

One of the principal objects of the invention is to provide gauging means of this character which enables any portion of a sheet or object to be selected and other portions thereof to be trimmed or cut away. Thus in trimming photographs, any figure, figures or setting or any portion of the photograph may be selected from the original photograph and properly centered on the portion of the photograph remaining after cutting. In cutting any photograph or any other sheet, the gauging means insures that the edges of the object as finally cut will be in proper relation to each other.

Another object is to provide a gauging means of this character which is adjustable for cutting sheets or photographs of various sizes.

In carrying out the present invention a gauge is provided which includes a frame. The frame may be of openwork construction or may have transparent portions or may have both characteristics. In any event, the frame is so constructed that its edges or other appropriate portions thereof are so positioned as to occupy, when the gauge is positioned on an object, a known or easily observed relation to the edges to be formed on the object. If desirable, the frame may be made of adjustable sections with means for holding the sections in any adjustment. Vacuum cups or other suitable means are provided on the frame for releasably attaching the frame to the object to be cut in any desired relative position of the frame and object. Means such as adjustable abutments may be provided on the frame and when provided are adapted to engage a gauge bar or other suitable gauge means associated with a cutter or cutting mechanism. In other words, the gauge constituting the present invention is used in conjunction with a cutting mechanism for a cutter which usually has suitable gauging means therewith. Usually the gauge means consists of a guaging bar paralleling the cutter in spaced relation thereto, but the construction of the gauging means associated with the cutter may vary. The present invention contemplates making the gauging means associated with the cutter adjustable and for this purpose where a gauge bar is employed, it may be eccentrically supported and have a plurality of faces, any of which may be operatively positioned, so that the operating faces selectively employed are located at different distances from the cutter.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a perspective view showing one form of gauging means embodying the present invention operatively associated with a gauge bar of a cutter, a portion of the cutting means being broken away for the sake of simplicity in illustration;

Figures 2 and 3 are vertical sectional views taken on lines 2—2 and 3—3, respectively, of Figure 1;

Figure 4 is a fragmentary perspective view showing an adjustable form of abutment which may be employed on the frame of the gauge;

Figure 5 is a perspective view showing another form of gauge embodying the present invention;

Figure 6 is a view in transverse vertical section taken on line 6—6 of Figure 5;

Figure 7 is a similar view taken on line 7—7 of Figure 5;

Figure 10 is a perspective view further illustrating the form of the invention showing Figures 8 and 9.

Figure 1:
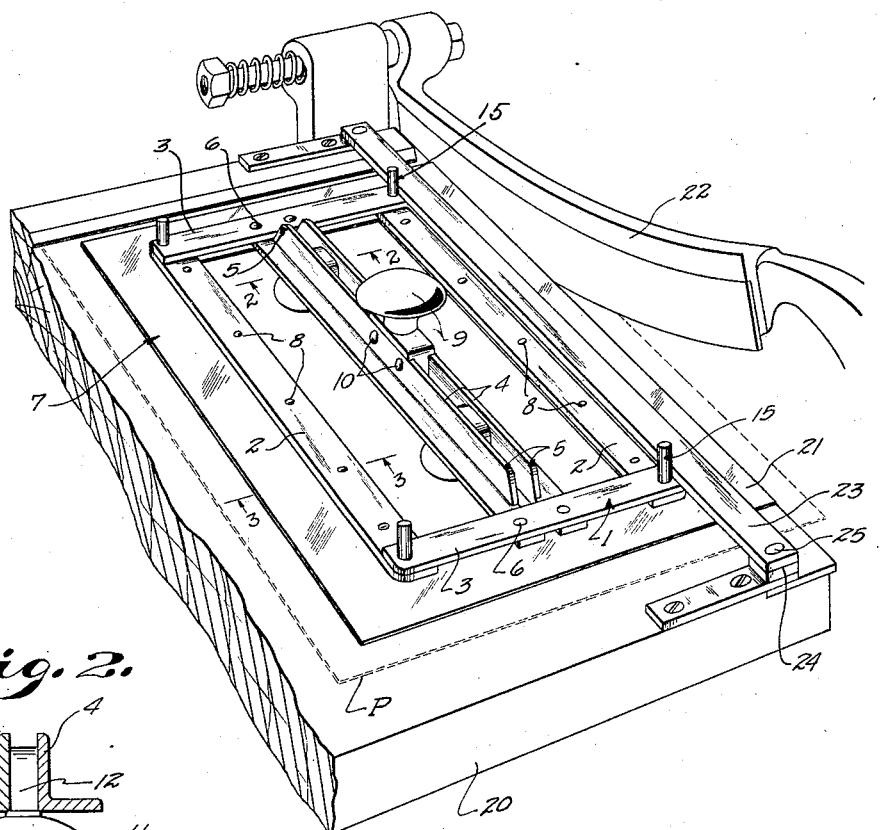
Figure 2:
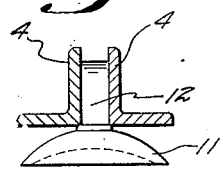
Figure 3:

Referring to the drawings, and particularly to Figures 1 to 3, inclusive, it will be seen that the gauge embodying the present invention comprises a frame designated generally at 1, and of any suitable construction, but which as shown, consists simply of side bars 2 and end bars 3 overlapping and fastened together at the corners of the frame. A pair of spaced longitudinally extending angle bars 4 are provided along the center of the frame, each angle bar 4 having one flange cut away as at 5 at each end thereof so that the other flange at the ends of each angle bar may overlap and snugly fit against the end bars 3 to which it is riveted as at 6. These angle bars 4 brace and strengthen the frame structure, but they also have further purposes and functions as will be hereinafter more fully described. The frame is completed by means of a transparent margin 7 of celluloid or the like which is riveted as at 8 to the side bars 3. The edges of the transparent margin 7 define approximately the edges of the sheet or photograph when trimmed or cut to final shape.

A handle 9 is provided and is riveted to the angles 4 as at 10. Rubber vacuum cups 11 are carried by the frame and as shown have integral shanks 12 compressed between the angle bars 4 so as to be held assembled with the frame. By shellacking or applying any other suitable adhesive to the shanks 12 prior to compressing them between the angles 4, a very firm and secure mounting of the vacuum cups on the frame may be had. The vacuum cups provide means for releasably attaching the frame to the photograph, sheet or other object to be cut in any desired relative position of the frame and sheet.

At the corners of the frame abutments are provided and may consist of pins 15 rigidly secured to the frame and projecting upwardly therefrom. These abutments may be made adjustable as illustrated in Figure 4 and this is effected by providing abutment blocks 16 having eccentric openings fitted on the pins 15. The blocks 16 are of polygonal form in cross section and the faces thereof are, due to the eccentric mounting of the blocks, positioned at different distances from the center of the pin 15. By turning the blocks on the pins, any face of the blocks may be operatively positioned. The pins 15 are longer than the blocks 16 and have their upper ends projecting above the blocks and threaded to receive wing nuts 17 which may be used to clamp the blocks in adjusted position.

The cutting mechanism with which the gauge is used may be of any suitable construction and in Figure 1 is shown as comprising a table 20 having a fixed knife 21 at one edge thereof. A movable knife 22 co-operates with the fixed knife 21. Paralleling the fixed knife 21 is a gauge bar 23 which is fixedly supported in spaced relation to the table 1 by brackets 24 and fastening devices 25.

In using the device for trimming the photograph such as indicated by dotted lines at P in Figure 1, the photograph is laid flatly on any suitable support and the gauge is positioned over the same. Practically all portions of the photograph may be viewed through the open work and transparent structure of the gauge and so the gauge may be centered over the portion of the photograph that is desired and the edges of the transparent portion 7 are utilized to determine the edges of the photograph in its final form. The gauge is then pressed forcibly down upon the photograph which causes the vacuum cups to have gripping engagement therewith, thereby releasably attaching the gauge to the photograph. The gauge with the photograph attached may be then placed on the table and slid over toward the cutter until the pins engage the bar 23. The movable cutter may then be brought down to cut off one edge of the photograph. The other edges may be similarly cut off by shifting the gauge to successively bring such edges into proper relation with the cutters 21 and 22.

In Figures 5, 6, and 7, a gauge embodying the present invention and having an adjustable frame is shown. This adjustable frame consists of a central guide or connecting member 30 having its upper face provided with a groove or guideway 31 and its lower face provided with a similar guideway or groove 32 which extends at right angles to the guide 31. The guideway 31 receives two supporting bars 33 and 34 of frame sections 35 and 36; and the guideway 32 receives supporting bars 37 and 38 of frame sections 39 and 40. The supporting bars 33, 34, 37 and 38 are just slightly thicker than their grooves are deep and so project just slightly above the grooves to co-act with clamp plates 41 and 42 mounted on the upper and lower sides of the connecting member and guide 30 and adapted to be forced into clamping engagement with the supporting bars by means of screws 43 extending loosely through openings provided in the plate 41 and the connecting member 30 and threaded into openings provided therefor in the lower clamp plate 42. Each frame section includes a rigid metal frame member 45 riveted or otherwise securely fastened to its supporting bar and a transparent margin 46 of celluloid or the like riveted as at 47 to the metal frame member 45. At the ends of each metal frame member abutments 48 are provided. As shown in Figure 5, these abutments consist of integral upturned extensions on the metal frame members but it is to be understood that the construction of these abutments may be varied.

Figure 8:
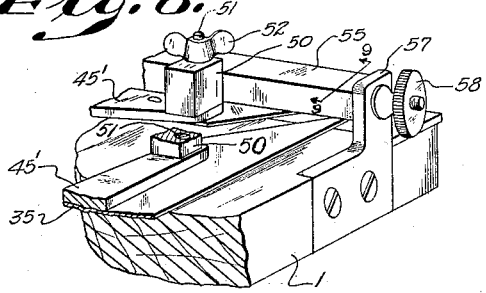
Figure 8 is a fragmentary perspective view showing adjustable abutments employed on the adjustable frame of Figure 5 and illustrating the same use in conjunction with an adjustable gauge bar of a cutter.

They may consist of separate pins similar to the pins 15 which are secured to the ends of the metallic frame members 45 or as shown in Figures 8 and 10 they may consist of abutment blocks 50 eccentrically mounted on pins 51 rigidly connected to and upstanding from the ends of the flat rigid metal frame members 45' of the frame sections designated at 39' and 40' as shown in Figures 8 and 10. The pins 51 project above the blocks 50 and have wing nuts 52 threaded thereon for securing the blocks 50 in adjusted position.

The adjustable frame adapts the gauge for use with various sizes and gives a wider range of adjustment than can be obtained from employing adjustable abutments on the frame of the gauge or an adjustable cutter gauge such as will now be described.

Figure 9:
Figure 9 is a view in transverse section taken on line 9—9 of Figure 8 and illustrating the eccentric mounting on the adjustable gauge bar of the cutter.

In lieu of using a fixed gauge bar 23, an adjustable gauge bar such as indicated at 55 may be provided. As shown in Figures 8 and 9, the bar 55 is of rectangular or polygonal form in cross section and is eccentrically and fixedly mounted on a supporting shaft 56. The ends of the shaft 56 project beyond the bar 55 and are rotatable in bearing brackets 57 provided on the table 1. Thumb nuts 58 are threaded on the ends of the shaft 56 which project beyond the bearing brackets 57 and may be tightened up to releasably secure the gauge bar 55 in any adjustment. As the different faces of the gauge bar 55 are located at different distances from the axis of the shaft 56 which is positioned in fixed relation to the cutters, the different faces of the gauge bar when operatively positioned serve to limit definitely and differently the approach of the gauge frame to the cutters.

Of course it is to be understood that with this adjustable cutter gauge bar, any form or type of gauge embodying the present invention may be employed.

In all forms of the present invention the gauge is centered or otherwise properly positioned over the photograph or other object to be cut and it is held in such position by the action of the vacuum cups. As the vacuum cups maintain the proper, relative position of the gauge and photograph or other object, the frame may be shifted or turned angularly to present successively the several edges of the object to be trimmed or cut.

While the gauge embodying the present invention is shown to be of rectangular form, it is to be understood that the shape of the gauge may be varied and various polygonal and other forms are contemplated.

The invention claimed is:

1. A gauge for use in cutting comprising a frame, means for releasably attaching the frame to the object to be cut in any desired relative position of the frame and object, and abutments adjacent the corners of the frame adapted for engagement in pairs with gauging means of a cutter.

2. A gauge for use in cutting comprising a frame, vacuum cups on the frame for releasably attaching the frame to the object to be cut in any desired relative position of the frame and object, and means on the frame adapted for engagement with gauging means of a cutter.

3. A gauge for use in trimming the edges of photographs and comprising an openwork frame having transparent margins, the edges of which define approximately the edges of the photograph when trimmed, vacuum cups on the frame engageable with any part of the surface of the photograph to cause any selected part of the photograph to be comprehended within the edges of the margins and means on the frame adapted to engage gauging means of a cutter to properly position the edges of the margins relative to the cutter.

4. A gauge comprising a frame, portions of which are so positioned as to occupy, when the gauge is positioned on an object, a known relation to the edges to be formed on the object, and vacuum cups on the frame for releasably attaching the frame to the object to be cut in any desired relative position of the frame and object.

5. A gauge for use in cutting comprising a frame, means for releasably attaching the frame to the object to be cut in any desired relative position of the frame and object, and means on the frame adapted for engagement with gauging means of a cutter and comprising adjustable abutments.

6. A gauge for use in cutting comprising a frame, means for releasably attaching the frame to the object to be cut in any desired relative position of the frame and object, and means on the frame adapted for engagement with gauging means of a cutter and comprising pins on the frame, abutment blocks eccentrically mounted on the pins, and means for releasably holding the abutment blocks in any position.

7. A gauge for use in cutting comprising an adjustable frame having relatively adjustable sections and means for releasably holding the sections in any adjustment and means for releasably attaching the frame to the object in any desired relative position of the frame and object.

8. A gauge for use in cutting comprising an adjustable frame having relatively adjustable sections and means for releasably holding the sections in any adjustment, vacuum cups on the frame for releasably attaching the frame to the object to be cut in any desired relative position of the frame and object, and abutments on the movable sections of the frame adapted for engagement with gauging means of a cutter.

9. The combination with cutting means having a gauge associated therewith, of a cooperable gauge comprising a frame, vacuum cups on the frame for releasably attaching the frame to the object to be cut in any desired relative position of the frame and object, and means on the frame and adapted to engage the gauge associated with the cutter.

10. The combination with cutting means having a gauge associated therewith, of a cooperable gauge comprising a frame, vacuum cups on the frame for releasably attaching the frame to the object to be cut in any desired relative position of the frame and object, and eccentrically mounted abutments carried by the frame and adapted to engage the gauge associated with the cutter.

11. The combination with cutting means having an adjustable gauge bar associated therewith, of a co-operable gauge comprising a frame, means for releasably securing the frame to the object to be cut in any desired relative position of frame and object, and adjustable abutments on the frame engageable with the gauge bar when any portion of the frame is presented thereto to position the frame and the object to be cut in proper relation to the cutting means.

12. A gauge for use in cutting comprising an open work frame adapted to be positioned upon the object to be cut with its edges in any desired relation to the edges to be cut on the object, means for releasably attaching the frame to the object to be cut in any desired relative position of the frame and object, while leaving the edges of the object free and unobstructed for cutting, and means on the frame adapted to engage gauging means of a cutter to properly position the frame and consequently the edges of the object relative to the cutter.

13. The combination with cutting means having a gauge bar associated therewith, of a cooperable gauge comprising a frame, means for releasably securing the frame to the object to be cut in any desired relative position of the frame and object, while leaving the edges of the object free and unobstructed for cutting and a plurality of spaced abutments on the frame, at least two of said spaced abutments being engageable with the gauge bar when any portion of the frame is presented thereto whereby to position the frame and the object to be cut in proper relation to the cutting means.

14. The combination with cutting means having a gauge bar formed with a plurality of faces adapted to be selectively utilized, means for eccentrically mounting the gauge bar, means for releasably securing the gauge bar in any adjustment, of a cooperable gauge comprising a frame, means for releasably securing the frame to the object to be cut in any desired relative position of the frame and object, while leaving the edges of the object free and unobstructed for cutting and abutments on the frame engageable with the selected face of the gauge bar whereby the frame and the object to be cut are positioned in proper relation to the cutting means.

In witness whereof, I hereto affix my signature.

ALFRED LAUKHUFF.